Patented May 20, 1947

2,420,641

UNITED STATES PATENT OFFICE 2,420,641

PROCESS FOR PREPARING dl-HISTIDINE AND INTERMEDIATES THEREFOR

Noel F. Albertson, East Greenbush, and Sydney Archer, Albany, N. Y., assignors to Winthrop Chemical Company, Inc., New York, N. Y., a corporation of New York No Drawing. Application September 22, 1944, Serial No. 555,404

9 Claims. (Cl. 260—309)

This invention relates to a process for preparing dl-histidine, and to intermediates therefor.

Histidine has been synthesized hitherto only by the methods of Pyman, who first prepared it by treating one mole of 4-(chloromethyl)imidazole hydrochloride with two moles of ethyl chloromalonate, decomposing the condensation product with mineral acid, and aminating the thus-formed 2-chloro-3-(4-imidazole)-propanoic acid to yield the desired amino acid [J. Chem. Soc., 99, 1386–1401 (1911)]. Pyman later synthesized histidine by condensing 4-imidazolealdehyde with hippuric acid by Erlenmayer's azlactone procedure [J. Chem. Soc., 109, 186–202 (1916)].

Little use has been made of Pyman's syntheses, however, principally because of the difficulties encountered in some of the steps (Schmidt, Chemistry of the Amino Acids and Proteins, p. 71, 1938).

We have discovered a process for preparing dl-histidine which employs fewer steps and gives higher yields of dl-histidine than either of the methods of Pyman. Furthermore, our process is more economical in that it requires only one mole of the substituted malonic ester involved in the condensation step as contrasted with the two moles required in the earlier of Pyman's processes.

Our process comprises condensing a 4-(halomethyl)-imidazole, or a hydrohalic acid salt thereof, with a compound having the formula

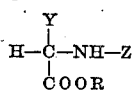

in which R is alkyl, Y is cyano or carbalkoxy and Z is lower aliphatic acyl, in the presence of an alkaline condensing agent, for example, an alkali metal alcoholate, and decomposing the condensation product by heating it with a strong mineral acid, thereby producing dl-histidine. The reactions involved in our process can be represented by the following equations:

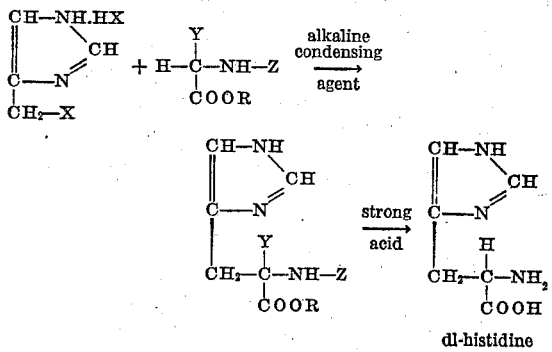

where R is alkyl, Y is cyano or carbalkoxy, Z is lower aliphatic acyl, and X is halogen.

When hydrochloric acid is used as the strong mineral acid for the decomposition of the condensation product, the dl-histidine is obtained as the hydrochloride, from which salt it is inconvenient to obtain the free amino acid. For this reason we prefer to use sulfuric acid, since the sulfate ion can be removed from the reaction mixture as barium sulfate, thus permitting isolation of the free amino acid.

The particular alkyl lower-aliphatic-acylaminomalonate or alkyl lower-aliphatic-acylaminocyanoacetate can be ethyl acetylaminomalonate, methyl propionylaminomalonate, ethyl acetylaminocyanoacetate, or any like compound in which preferably the alkyl and the lower-aliphatic acyl group are both derived from the lower, fairly water-soluble alcohols and acids, respectively.

As the alkaline condensing agent we use any strong base capable of forming a metallo-derivative with the substituted cyanoacetic ester or malonic ester. For example, there may be used sodium methoxide, potassium ethoxide, calcium ethoxide sodamide, or the like.

Our invention is illustrated by the following examples without, however, being limited to the details thereof.

*Example 1*

Seventeen grams of ethyl cyanaceturate are dissolved in 150 ml. of anhydrous ethanol to which 4.6 g. of sodium have been added. The solution is cooled in an ice bath and then 15.2 g. of 4-(chloromethyl)imidazole hydrochloride are added rapidly to the solution. Precipitation of sodium chloride begins at once. The reaction mixture is allowed to stand at room temperature for forty minutes and then the alcohol is removed in vacuo. The yellow-brown residue is dissolved in chloroform and the solution is boiled with charcoal and filtered. The clear, yellow filtrate is concentrated in vacuo to a red viscous residue. A small amount of water is added to the residue, whereupon the solid crystallizes. The crystals are stirred with 25 ml. of water and are then collected on a filter and washed with 10 ml. of ice water. The product, which is ethyl 2-acetamido-2-cyano-3-(4-imidazole)-propanoate, weighs 17.6 g. The pure compound, which is deliquescent, melts at 111° C.

Two and nine-tenths grams of ethyl 2-acetamido-2-cyano-3-(4-imidazole)propanoate are placed in 17 ml. of water containing 1 ml. of concentrated sulfuric acid and the mixture is refluxed for sixteen hours, during which time carbon dioxide is evolved. To the colorless solution thus obtained is added a slight excess of barium hydroxide to remove the sulfate ions. The excess of barium ions are then removed by adding "dry ice" (solid carbon dioxide) to the solution. The precipitated solids are removed by filtration and the filtrate is concentrated in vacuo to a pale yellow shellac-like residue, weighing 2.2 g. This residue, which is dl-histidine, can be recrystallized from hot water. The crystals melt at approximately 274–285° C. with decomposition. The hydrochloride melts at 229–232° C. with decomposition.

*Example 2*

Twenty-six and six-tenths grams of ethyl acetamidomalonate are added to 200 ml. of anhydrous ethanol in which 5.62 g. of sodium have been dissolved. The solution is cooled to 0° C. and 18.6 g. of 4-(chloromethyl)imidazole hydrochloride are added rapidly. The reaction mixture is allowed to stand at room temperature for thirty minutes and is then boiled with charcoal and filtered. The alcohol is removed from the filtrate in vacuo, yielding a pale orange, viscous residue which crystallizes on addition of water. The crystals are dissolved in 75 ml. of water and the solution is boiled with charcoal and filtered, the solid being washed with ice water. The product, which is the monohydrate of ethyl 2-acetamido-2-carbethoxy-3-(4-imidazole)propanoate, weighs 25.8 g. It melts at 96–99° C.

Sixteen and seven-tenths grams of ethyl 2-acetamido-2-carbethoxy-3-(4-imidazole)propanoate monohydrate are dissolved in 85 ml. of water containing 5 ml. of concentrated sulfuric acid and the solution is refluxed for ten hours. The solution is then adjusted to pH 7 by addition of barium hydroxide. Charcoal is added to the solution and the mixture is filtered. "Dry ice" is added to the filtrate to precipitate the last traces of excess barium ion, and the mixture is filtered again. The filtrate is concentrated in vacuo until crystals begin to appear. The residue is then re-dissolved in hot water and an equal volume of ethanol is added. The product, which is dl-histidine, separates from the solution on cooling. The yield is 3.67 g. of crystals melting at 271–272° C. with decomposition.

We claim:

1. In a process for preparing dl-histidine the steps which comprise condensing, in the presence of an alkaline condensing agent, a 4-(halomethyl)imidazole with a compound having the formula

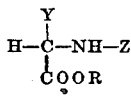

where R is alkyl, Z is lower aliphatic acyl, and Y is a member of the group consisting of cyano and carbalkoxy, and heating the condensation product with a strong mineral acid.

2. In a process for preparing dl-histidine the steps which comprise, condensing a 4-(halomethyl)imidazole with a compound having the formula

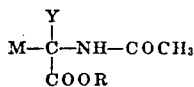

where M is a member of the class consisting of the alkali metals and alkaline earth metals, R is alkyl, and Y is a member of the group consisting of cyano and carbalkoxy, and heating the condensation product with a strong mineral acid.

3. In a process for preparing dl-histidine the steps which comprise condensing a 4-(halomethyl)imidazole with a compound having the formula

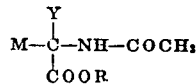

where M is a member of the class consisting of the alkali metals and alkaline earth metals, R is alkyl, and Y is carbalkoxy, and heating the condensation product with a strong mineral acid.

4. In a process for preparing dl-histidine the steps which comprise condensing a 4-(halomethyl)imidazole with a compound having the formula

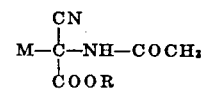

where M is a member of the class consisting of the alkali metals and alkaline earth metals and R is alkyl, and heating the condensation product with a strong mineral acid.

5. A compound having the formula

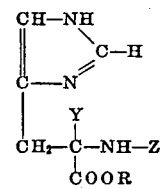

where R is alkyl, Y is a member of the group consisting of cyano and carbalkoxy, and Z is lower aliphatic acyl.

6. The compound having the formula

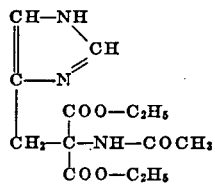

7. The compound having the formula

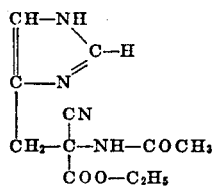

8. A process for preparing dl-histidine which comprises condensing a 4-(halomethyl)imidazole with a compound having the formula

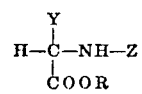

in which R is alkyl, Y is a member of the group consisting of cyano and carbalkoxy and Z is lower aliphatic acyl, in the presence of an alkaline condensing agent, heating the condensation product with sulfuric acid and isolating dl-histidine therefrom.

9. A process for preparing dl-histidine which comprises condensing a 4-(halomethyl)imidazole with a compound having the formula

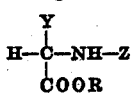

in which R is alkyl, Y is a member of the group consisting of cyano and carbalkoxy and Z is lower aliphatic acyl, in the presence of an alkali metal alcoholate, heating the condensation product with sufuric acid and isolating dl-histidine therefrom.

NOEL F. ALBERTSON.
SYDNEY ARCHER.